United States Patent
Su et al.

(10) Patent No.: US 8,059,604 B2
(45) Date of Patent: Nov. 15, 2011

(54) SYSTEM AND METHOD OF MEASURING HETEROGENEOUS NETWORK MOBILE COMMUNICATION APPARATUS AND RECORDING MEDIUM THEREOF

(75) Inventors: Chih-Wei Su, Taipei (TW); Wen-Hsin Wei, Taipei (TW)

(73) Assignee: Institute For Information Industry, Taipei (TW)

( * ) Notice: Subject to any disclaimer, the term of this patent is extended or adjusted under 35 U.S.C. 154(b) by 930 days.

(21) Appl. No.: 11/896,012

(22) Filed: Aug. 29, 2007

(65) Prior Publication Data

US 2008/0144580 A1 Jun. 19, 2008

(30) Foreign Application Priority Data

Dec. 15, 2006 (TW) ............................... 95147264 A (51) Int. Cl.
*H04W 4/00* (2009.01)
(52) U.S. Cl. ...................................... 370/332
(58) Field of Classification Search ........................ None
See application file for complete search history.

(56) References Cited

U.S. PATENT DOCUMENTS

| | | | |
|---|---|---|---|
| 7,089,004 B2 | 8/2006 | Jeong et al. | |
| 2003/0147364 A1 | 8/2003 | Watanabe et al. | |
| 2004/0198234 A1* | 10/2004 | Wacker et al. | 455/67.13 |
| 2004/0258012 A1* | 12/2004 | Ishii | 370/328 |
| 2005/0190747 A1* | 9/2005 | Sindhwani et al. | 370/352 |
| 2006/0246895 A1* | 11/2006 | Ryu | 455/434 |
| 2007/0097877 A1* | 5/2007 | Hoekstra et al. | 370/252 |

* cited by examiner

*Primary Examiner* — Jianye Wu
(74) *Attorney, Agent, or Firm* — Rabin & Berdo, P.C.

(57) ABSTRACT

A signal measurement method for a mobile communication apparatus supporting multiple transmission interfaces to perform communication transmission in a heterogeneous network environment, system and a recording medium thereof. Changes in the signal strength of an active network transmission interface are employed to adjust signal measurement periods of other non-active network transmission interfaces, thereby reducing the signal measurement frequency of these non-active network transmission interfaces. Moreover, as for the situation that a specific transmission interface periodically reports the signal measurement result to a remote network server, the signal measurement time during the report can also be reduced. By solving the power consumption problem caused by frequently activating the signal measurement of the mobile communication apparatus, the efficacies of saving power and improving the standby time and talk time can be achieved.

33 Claims, 7 Drawing Sheets

| TRANSMISSION MEDIA | CHANGES IN SIGNAL STRENGTH | | | |
|---|---|---|---|---|
| WWAN | NO | NO | NO | YES |
| WMAN | NO | NO | YES | YES |
| WLAN | NO | YES | YES | YES |
| WPAN | YES | YES | YES | YES |
| | MOVEMENT RANGE (FROM SMALL TO LARGE) | | | |

SYSTEM AND METHOD OF MEASURING HETEROGENEOUS NETWORK MOBILE COMMUNICATION APPARATUS AND RECORDING MEDIUM THEREOF

CROSS-REFERENCE TO RELATED APPLICATIONS

This non-provisional application claims priority under 35 U.S.C. §119(a) on Patent Application No(s). 095147264 filed in Taiwan, R.O.C. on Dec. 15, 2006, the entire contents of which are hereby incorporated by reference.

BACKGROUND

1. Field of Invention

The present invention relates to a system and method for measuring a heterogeneous network signal and a recording medium thereof. More particularly, the present invention relates to a system and method for adjusting a signal measurement period of other non-active network transmission interfaces applied to a mobile communication apparatus supporting multiple transmission interfaces, according to changes in the signal strength of the active network transmission interface.

2. Related Art

Communication transmission networks constructed based on various transmission interface standards are continuously developed with coming era of mobile communication transmission. As each transmission interface has different transmission property specifications in the standard (such as coverage, data rate, and mobility), usually different applications have different transmission interfaces correspond to the requirements.

Recently, some system operators begin to construct a so-called "heterogeneous network" in order to provide better service. The "heterogeneous network" refers to a communication transmission network architecture using multiple transmission interfaces to provide high quality communication transmission service. Transmission interfaces can be switched according to the quality or the cost under this architecture to meet the user's requirements. For the operators, the "heterogeneous network" can not only provide better services for their users, but also reduce the cost of building networks.

For the user, "heterogeneous network" is that the user can not only enjoy various applications and better services by different transmission interfaces in the "heterogeneous network", but also the user can save their cost by using the suitable transmission interface for different situation. In order to enjoy the advantages of the "heterogeneous network", the user has to use the mobile communication apparatus supporting multiple transmission interfaces to perform communication transmission, i.e., the so-called "multi-mode" mobile communication apparatus. Recently, most of the common "multi-mode" mobile communication apparatuses provide at least one transmission interface applicable to a cellular network, for example, general packet radio service (GPRS), and at least one IP-based mobile access network, for example, wireless fidelity (Wi-Fi). In order to make sure that the "multi-mode" transmission interface in the mobile communication apparatus keeps operating normally when required, most of the transmission interface specification requires measuring the quality of the signal periodically to handle the status of each transmission interfaces.

Therefore, no matter for an active network transmission interface or a non-active network transmission interface in the mobile communication apparatus, according to the transmission interface specification, when a certain periodic time is reached, the signal measurement operation is activated. As each signal measurement involves the operation of mobile communication apparatus software/hardware, it is quite power-consuming. Especially, when the mobile communication apparatus supports more and more transmission interfaces, the periodic signal measurement of different transmission interfaces may greatly consume the power of the mobile communication apparatus. If the situation that a specific transmission interface needs to report the signal measurement result to the network server of the remote communication transmission network periodically, the standby time and talk time of the mobile communication apparatus is greatly reduced.

SUMMARY

Accordingly, under the heterogeneous network environment, usually the mobile communication apparatus supporting multiple transmission interfaces must face the issue of frequently signal measurement and the further generated problem of insufficient standby time and talk time due to the excessive power consumption of the mobile communication apparatus. Therefore, the present invention provides a system and method of improving the signal measurement of a mobile communication apparatus in the heterogeneous network.

The system of measuring a heterogeneous network mobile communication apparatus, applied to a mobile communication apparatus supporting multiple transmission interfaces to perform communication transmission comprises a signal strength counting unit for using the obtained signal of the first transmission interface to calculate a signal strength, and determining whether the signal strength is changed or not, and a signal measurement period adjusting unit to selectively adjust the signal measurement period of the second transmission interface according to the determination result of the signal strength.

The detailed steps of the method are as follows. Firstly, an active network transmission interface is determined, and a signal is continuously and periodically measured according to a predetermined period of the active network transmission interface. Next, according to the signal of the active network transmission interface obtained through measurement, current signal strength is calculated, and it is determined whether the current signal strength is different from a previous one. If the signal strength is changed under a threshold, it is indicated that the mobile communication apparatus does not move a lot, and then the predetermined periods of other transmission interfaces with signal coverage larger than that of the active network transmission interface can be prolonged. If the signal strength is changed over a threshold, it is indicated that the mobile communication apparatus moves a lot, and then the signal is again periodically measured according to the predetermined periods of different transmission interfaces, respectively.

If one transmission interface is transferred from non-active network into active network, the invention can measure the signal strength and report the signal measurement result to the remote network server by following the network communication specification.

By the method of the present invention described in the above paragraph, the mobile communication apparatus may reduce the signal measurement frequency of the non-active network transmission interface, so as to reduce the power consumption and improve the standby time and talk time of the mobile communication apparatus.

As for the situation that a specific transmission interface periodically reports the signal measurement result to a remote network server, in the method provided by the present invention, after the predetermined periods of other transmission interfaces with a signal coverage larger than that of the active network transmission interface are prolonged, when the prolonged period has not been achieved, a previously preserved signal measurement result is reported, and when the prolonged period has been achieved, the signal is re-measured and the signal measurement result is updated.

By the method of the present invention described in the above paragraph, the mobile communication apparatus may reduce the signal measurement frequency of the non-active network transmission interface that must report the signal measurement result to the network server, so as to reduce the power consumption and improve the standby time and talk time of the mobile communication apparatus.

Viewed from the communication transmission network type, the transmission interface of the present invention may be a cellular network or an IP-based mobile access network. Viewed from the signal coverage of the communication transmission network, the transmission interface of the present invention may be any of wireless wide area network (WWAN), wireless metropolitan area network (WMAN), wireless local area network (WLAN), and wireless personal area network (WPAN).

The signal strength is calculated according to the value measured by the hardware of the mobile communication apparatus. For example, a Receive Signal Strength Indication (RSSI) value used in GSM (Global System for Mobile Communications) system or WCDMA (Wideband Code Division Multiple Access) system and a position measurement information in WCDMA system.

The definition of the signal coverage is the maximum signal covering region provided by a single access point in the communication transmission network.

As for the prolonging of the predetermined periods of other non-active network transmission interfaces with a signal coverage larger than the active network transmission interface, usually in the present invention, an N ($1<N<=\infty$) times of the formerly predetermined period is adopted as the prolonged period. N can be any positive number and may be adjusted according to the time period that the changed signal strength under a setting threshold.

The method provided by the present invention may, also be implemented via a recording medium, wherein the computer program recorded in the recording medium is read and performed, so as to solve the same problem in the same way and achieve the same efficacy.

The features and practice of the preferred embodiments of the present invention will be illustrated in detail below with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION

A signal measurement method directing to the mobile communication apparatus supporting multiple transmission interfaces (hereinafter referred to as mobile communication apparatus for short) is provided. Particularly, when used in a heterogeneous network environment, the provided method can greatly reduce the signal measurement frequency, so as to reduce the power consumption and improve the standby time and talk time of the mobile communication apparatus.

Figure 1:
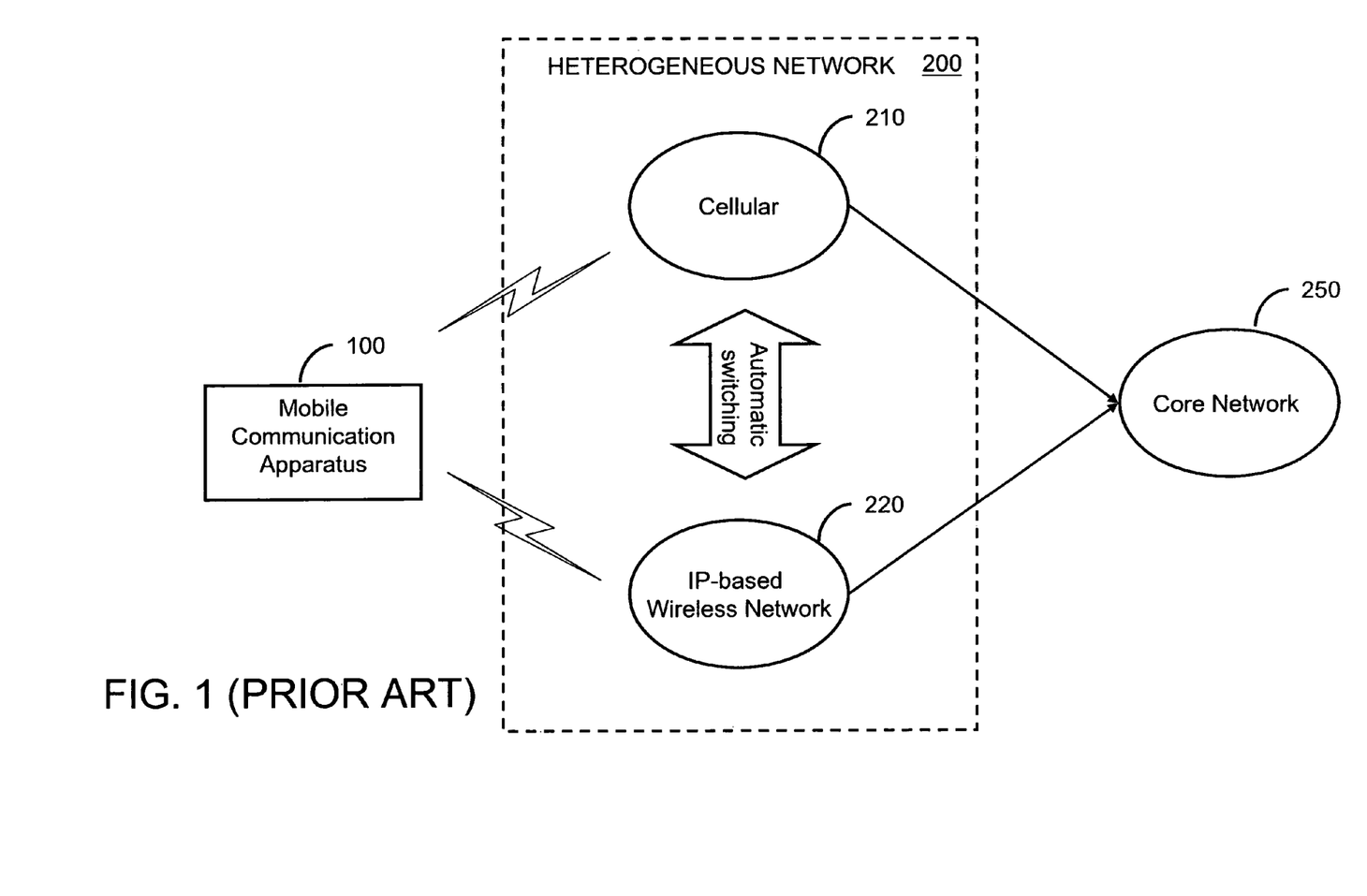
FIG. 1 is a schematic view of an application of a mobile communication apparatus supporting multiple transmission interfaces to perform communication transmission in a heterogeneous network according to a conventional art.

Referring to FIG. 1, a schematic view of the application of a mobile communication apparatus 100 in the conventional art in a heterogeneous network 200 is shown. In the figure, when the mobile communication apparatus 100 is used in the heterogeneous network 200, generally, either a Cellular network 210 or an IP-based wireless network 220 establishes links between the mobile communication apparatus 100 and a core network 250 for communication and transmission. The transmission interface of the mobile communication apparatus 100 used to establish links with the core network 250 is referred to as an "active network transmission interface", i.e., the transmission interface used by the mobile communication apparatus 100 for communication or transmission. Under the environment of the heterogeneous network 200, if the signal strength of the active network transmission interface of the mobile communication apparatus 100 is insufficient to provide service, usually, the mobile communication apparatus 100 may automatically switch to other available transmission interfaces to perform linking, for example, switch from IP-based wireless network to cellular network. However, the mobile communication apparatus 100 must periodically measure the signal of each supported transmission interface, so as to master the signal state of each transmission interface at any time. As the signal measurement is usually periodically performed by the software and hardware in the mobile communication apparatus 100 according to the predetermined period, when multiple different transmission interfaces are integrated in the mobile communication apparatus 100, the power consumption of the mobile communication apparatus 100 is quite large due to frequent signal measurement, which may affect the standby time and talk time of the mobile communication apparatus 100.

Figure 2:
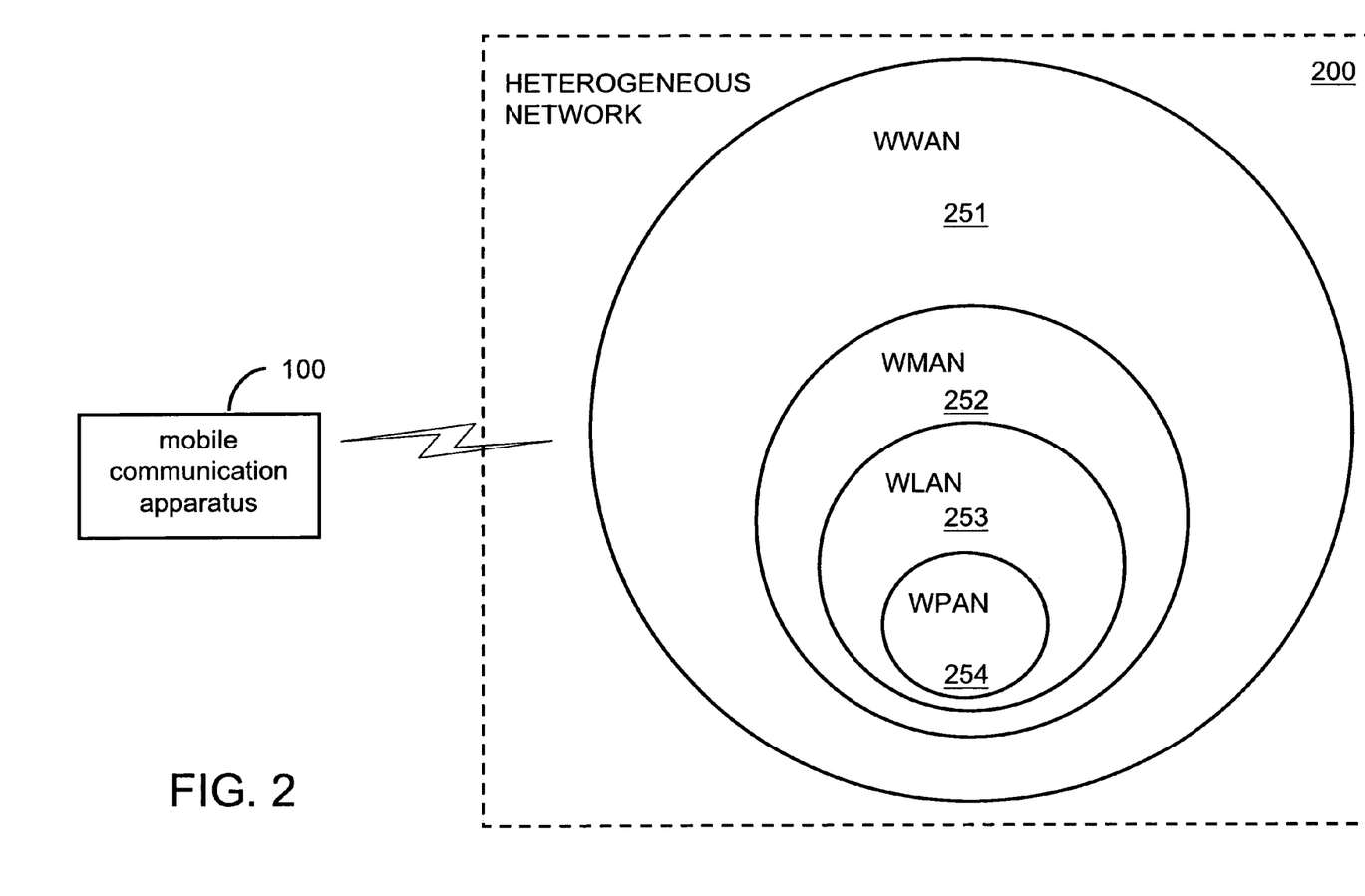
FIG. 2 is a schematic view of signal coverage of the multiple transmission interfaces.
Figure 3:
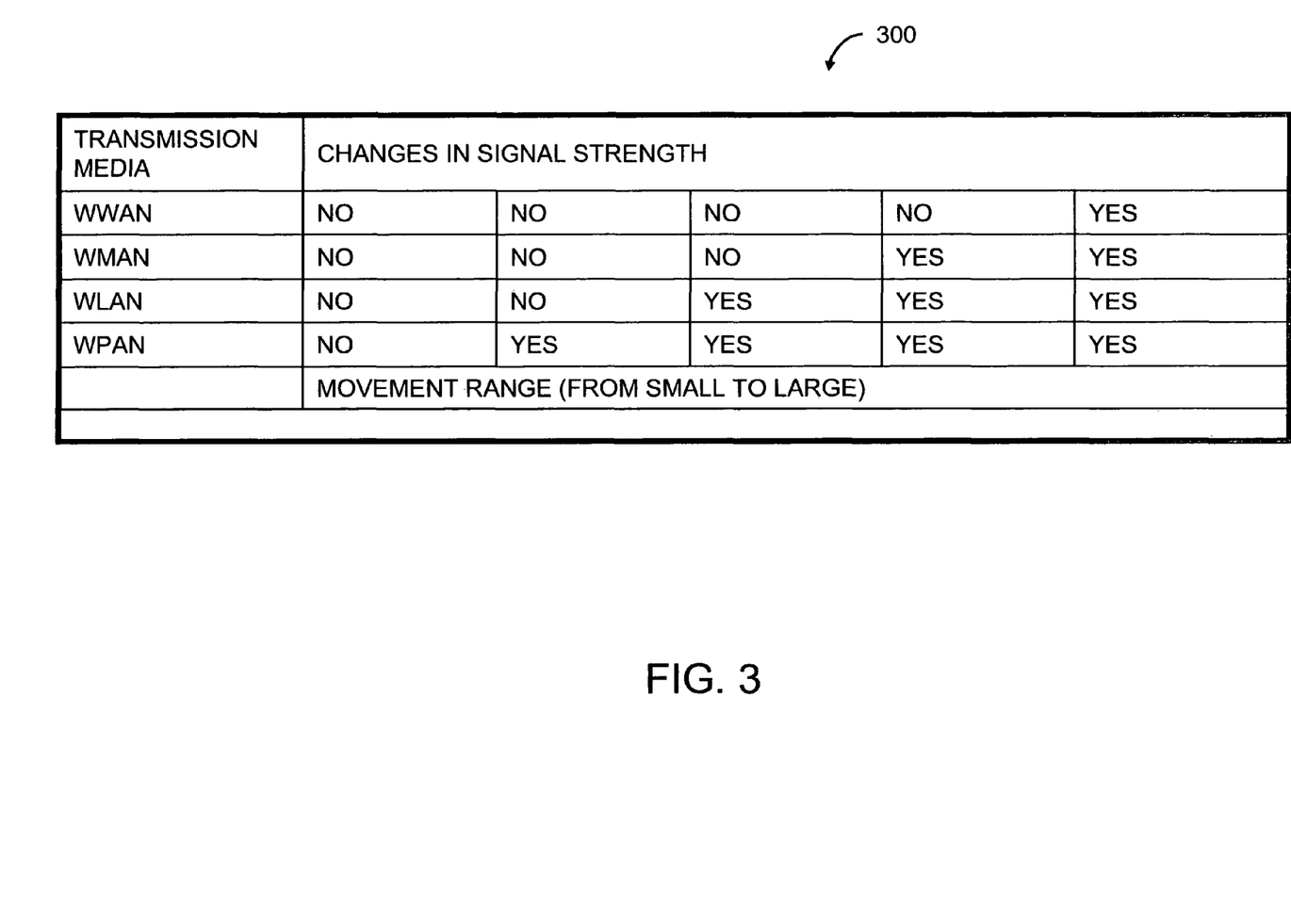
FIG. 3 is a schematic view of changes in the movement range and the signal strength of the communication transmission network of multiple transmission interfaces of the mobile communication apparatus supporting multiple transmission interfaces to perform communication transmission.

Therefore, FIGS. 2 and 3 illustrate the concept how to improve the signal measurement mechanism of the mobile communication apparatus 100 under the environment of the heterogeneous network 200.

FIG. 2 is a schematic view of the signal coverage of the multiple transmission interfaces. Basically, all the transmission interfaces can be covered by the two different communication transmission networks as previous mentioned, Cellular network 210 and IP-based wireless network 220. From large to small coverage the transmission interfaces can be classified into four types, i.e., Wireless Wide Area Network (WWAN) 251, Wireless Metropolitan Area Network (WMAN) 252, Wireless Local Area Network (WLAN) 253 and Wireless Personal Area Network (WPAN) 254 which is easily understood by those skilled in the art, and the details will not be described hereinafter. However, it is necessary to know that the "signal coverage" here refers to the maximum signal covering region of the transmission interface provided by a single access point in the communication transmission network. For Wi-Fi, the access point is a base station.

FIG. 3 is a schematic view obtained by concluding standard specifications of various transmission interfaces, wherein a table of changes in the movement range and the signal strength of various transmission interfaces in the communication transmission network is shown. It is known from the figure that for the transmission interface with smaller signal coverage, a slight movement of the mobile communication apparatus 100 in the communication transmission network may easily result in a change of the signal strength. On the contrary, for the transmission interface with larger signal coverage, only a great movement of the mobile communication apparatus 100 in the communication transmission network may cause a change of the signal strength. For example, referring to the WWAN 251 in the table, most of the movement situations of the mobile communication apparatus 100 may not result in changes of the signal strength, but once the movement range reaches the maximum, the signal strength is changed.

According to the standard specifications of various transmission interfaces, in the heterogeneous network 200, various transmission media must periodically perform signal measurement. For the active network transmission interface, it is necessary to periodically perform data transmission and link message communication with the remote network server in the communication transmission network. For the non-active network transmission interface, it is also necessary to periodically perform signal measurement. Therefore, the active network transmission interface or non-active network transmission interface may be in the same situation of frequent signal measurement. Particularly, there are more and more transmission interfaces integrated into a heterogeneous network mobile communication apparatus, which may worsen the power consumption problem of the mobile communication apparatus 100 due to signal measurement.

Therefore, an improved signal measurement system and method based on the technical concept derived from FIGS. 2 and 3 is further described below with reference to FIGS. 4 and 5.

Figure 4:
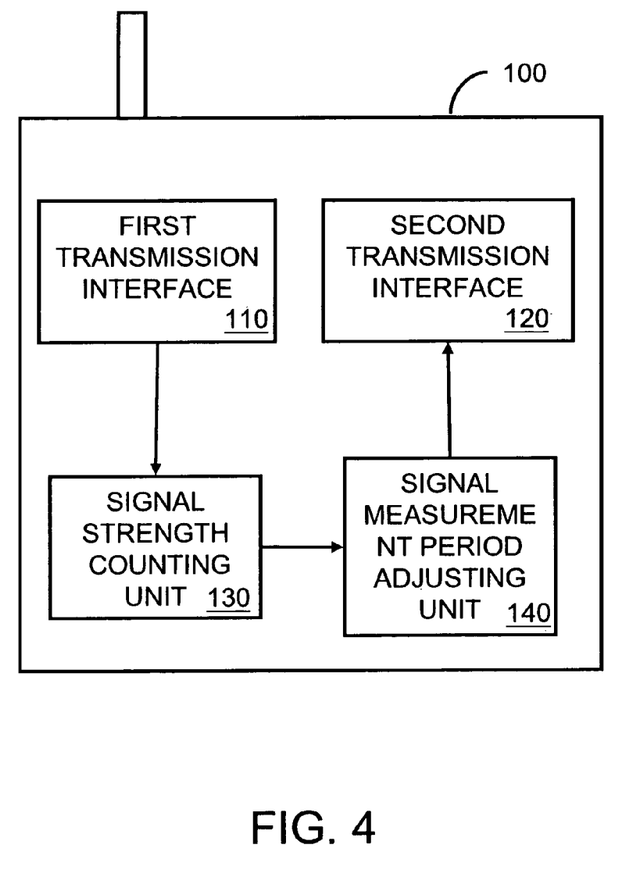
FIG. 4 shows main operation blocks of a system of measuring the heterogeneous network mobile communication apparatus applied to a mobile communication apparatus according to the embodiment.

FIG. 4 shows main blocks of a system of measuring the heterogeneous network mobile communication apparatus. The system is applied to a mobile communication apparatus 100 which simply illustrates main blocks related to the embodiment in the drawing. The system in the mobile communication apparatus comprises a signal strength counting unit 130 for using a signal obtained from the first transmission interface 110 to calculate a signal strength, and determining whether the signal strength is changed or not, and a signal measurement period adjusting unit 140 for detecting the variation of signal strength of aforesaid signals to selectively adjust the signal measurement period of a second transmission interface 120.

Figure 5:
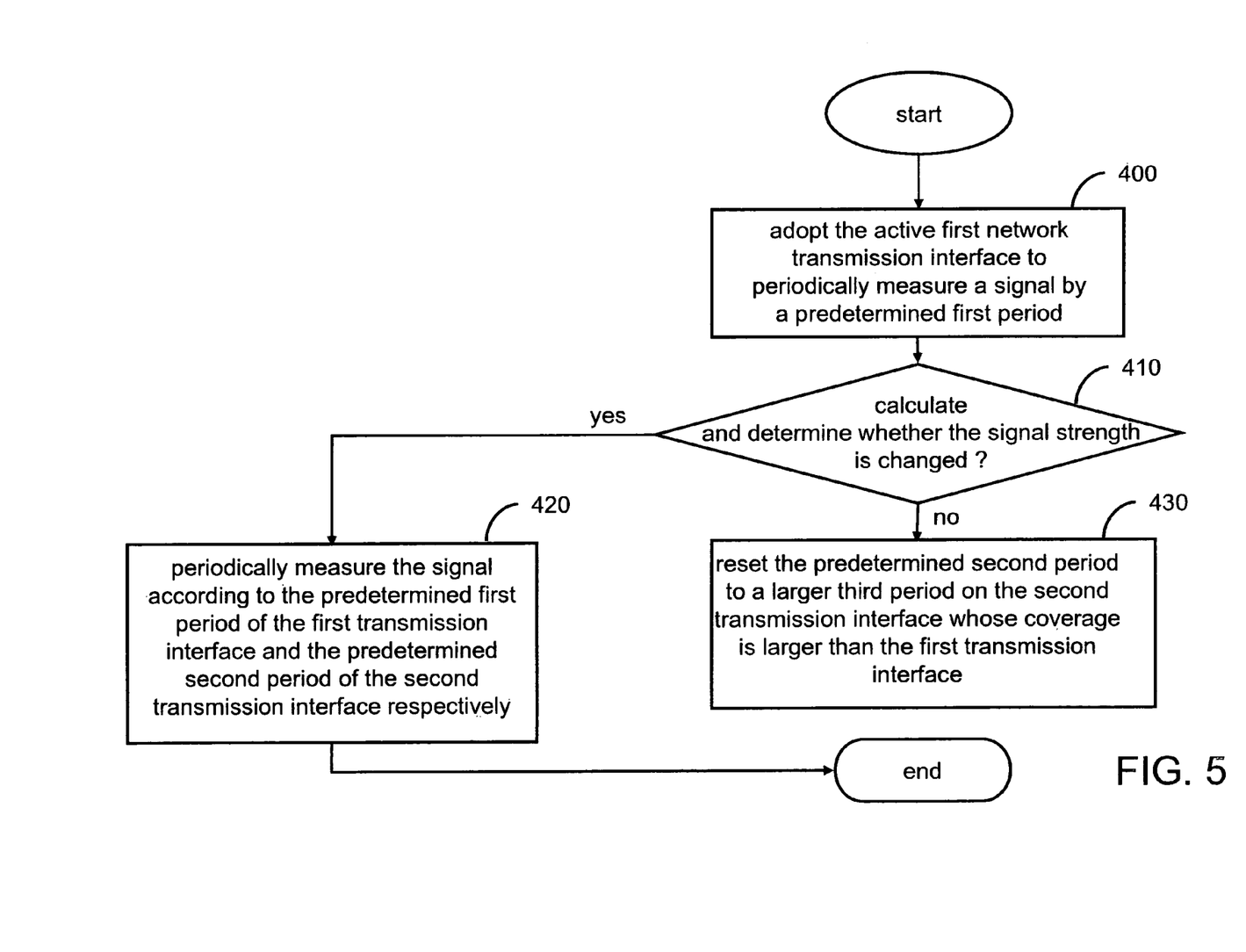
FIGS. 5 and 6 are flow charts of the operation of a method of measuring the heterogeneous network mobile communication apparatus according to the embodiment.

FIG. 5 shows an operation flow of signal measurement by controlling an non-active network transmission interface (hereinafter referred to as a second transmission interface 120, and it is assumed to be GPRS, usually a mobile communication apparatus 100 includes more than one non-active network transmission interfaces), wherein the second transmission interface 120 may have multiple types of appropriate transmission interfaces, and only one type is adopted here as an example. When the mobile communication apparatus 100 determines an active network transmission interface (hereinafter referred to as a first transmission interface 110, and it is assumed to be Wi-Fi) in the heterogeneous network 200, after the first transmission interface 110 is utilized according to the standard specification of the transmission interface, the signal is continuously and periodically measured according to the first period of the first transmission interface 110, and the signal measurement result is recorded to be reported to the network server (Step 400). During each measurement process, the signal obtained through measurement is first used to calculate a corresponding signal strength, and then it is determined whether the signal strength is changed or not (Step 410). Usually, the signal strength is calculated according to the value measured by the hardware of the mobile communication apparatus. For example, a RSSI (Receive Signal Strength Indication) value used in GSM system and WCDMA system or a position measurement information in WCDMA system. The signal strength of the received signal can be calculated through software, the hardware circuit design may also be adopted to calculate the signal strength of the received signal. Those techniques are known to those who are skilled in the related art and the details will not be described herein.

Then, according to the determination result of the signal strength, the method selectively performs the following steps.

(1) Step 420: if the signal strength is changed, it indicates that the mobile communication apparatus 100 generates certain movement to make the signal strength of the active first network transmission interface 110 change. At this moment, as the mobile communication apparatus 100 has not re-determined an active new network transmission interface, a corresponding periodic signal measurement is performed according to the predetermined period of each transmission interface, i.e., the signal measurement is periodically performed according to the standard specification. In other words, the first transmission interface 110 periodically performs signal measurement according to the predetermined first period, and the second transmission interface 120 periodically performs signal measurement according to the predetermined second period.

(2) Step 430: if the signal strength is not changed, it indicates that the mobile communication apparatus 100 does not generate any movement or the movement range thereof is not large. At this moment, the present invention resets (i.e. prolongs) the predetermined periods of other non-active second network transmission interfaces 120 with a signal coverage larger than that of the first transmission interface 110, and prolongs the predetermined second period of the second transmission interface 120 to be a third period larger than the original period length. The objective of prolonging the predetermined period is to reduce the signal measurement frequency of other non-active network transmission interfaces with a signal coverage larger than that of the first transmission interface 110, thereby achieving the efficacy of power saving. Therefore, basically, as long as other periods are prolonged, certain power saving effect can be achieved. If it is not considered that under specific conditions the transmission interface must perform signal measurement, the signal measurement operation of the second transmission interface 120 may be turned off directly, until the signal strength is changed. However, generally, only the formerly predetermined period is prolonged to keep the second transmission interface performing signal measurement operation after a certain period. At this time, the following expression may be employed to show the relationship between the formerly predetermined second period and the prolonged third period:

The third period=N*the second period, wherein 1<N<=∞.

N is any positive number and can be adjusted according to the time period that the changed signal strength under a setting threshold.

The embodiment does not particularly limit the determination on whether the signal strength is changed or not. Basically, the signal strength difference value between the signal strength (St) obtained by the recent measurement period and the signal strength (St−1) obtained by the previous measurement period is used as the determining reference and Step 420 is performed when difference exists. In order to avoid the slight change in the signal strength resulting in unnecessary false determination, a strength threshold value is further set when it is determined whether the signal strength is changed. When the difference between St and St−1 exceeds the strength threshold value, Step 420 is performed, thereby reducing many unnecessary operation errors and false determinations.

For Step 410, a special situation must be considered, that is, when the signal strength (St) obtained by the recent measurement period is too weak, which indicates that the mobile communication apparatus 100 is in a situation of weak signal, the method still performs Step 420.

Figure 6:
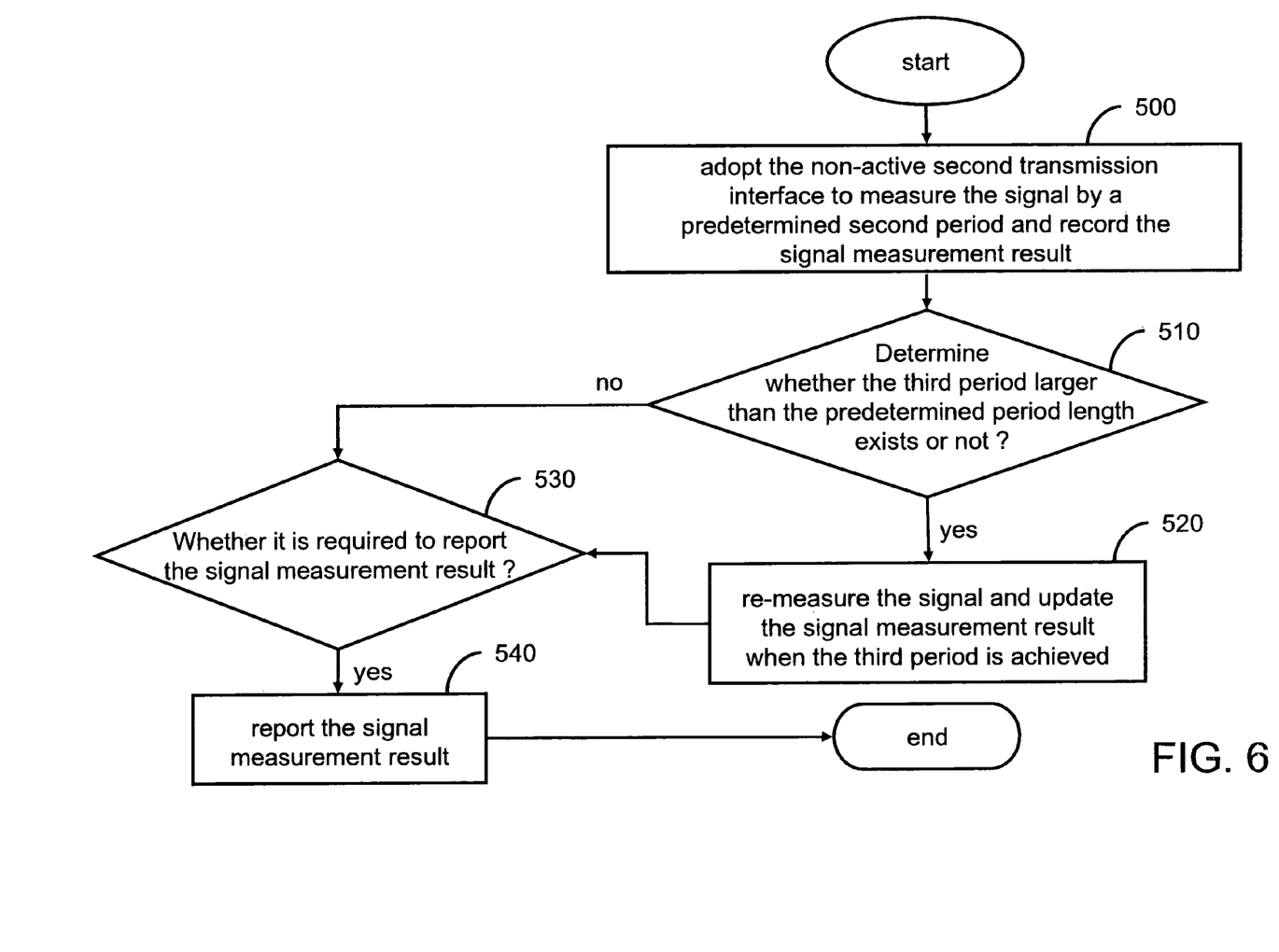

FIG. 6 shows a flow of achieving the operation adjustment of the second transmission interface 120 according to the operation result of FIG. 5. First, under a normal situation, the non-active second network transmission interface 120 still periodically performs signal measurement according to the predetermined second period of the standard specification, and records the signal measurement result (Step 500); while the second transmission interface 120 continuously determines whether the third period is generated (Step 510). According to whether the third period is generated or not, the second transmission interface 120 selectively performs the following different steps according to the method.

(1) Step 520: when the third period exists, it indicates that the second transmission interface 120 must prolong the predetermined measurement period to perform signal measurement. At this time, when achieving at the third period, the second transmission interface 120 re-measures the signal and updates the signal measurement result. In other words, before achieving the third period, the second transmission interface 120 keeps the original signal measurement result.

(2) Step 530: when the third period does not exist, it indicates that the second transmission interface 120 performs signal measurement according to the predetermined measurement period. At this time, when achieving the formerly predetermined second period, the second transmission interface 120 re-measures the signal and updates the signal measurement result.

Here, if the second transmission interface 120 belongs to the type that needs to report the signal measurement result to the network server (Step 530), Step 540 is further performed to report the signal measurement result to the network server. It should be noted that during the report, as the report frequency of the second transmission interface 120 is not changed because of the third period (i.e., the report period of the second transmission interface 120 is the second period), when the third period exists, if the second period is achieved and it is necessary to perform a report, in the present invention, the previously preserved signal measurement result is reported, and signal measurement is no longer activated according to the second period.

Figure 7:
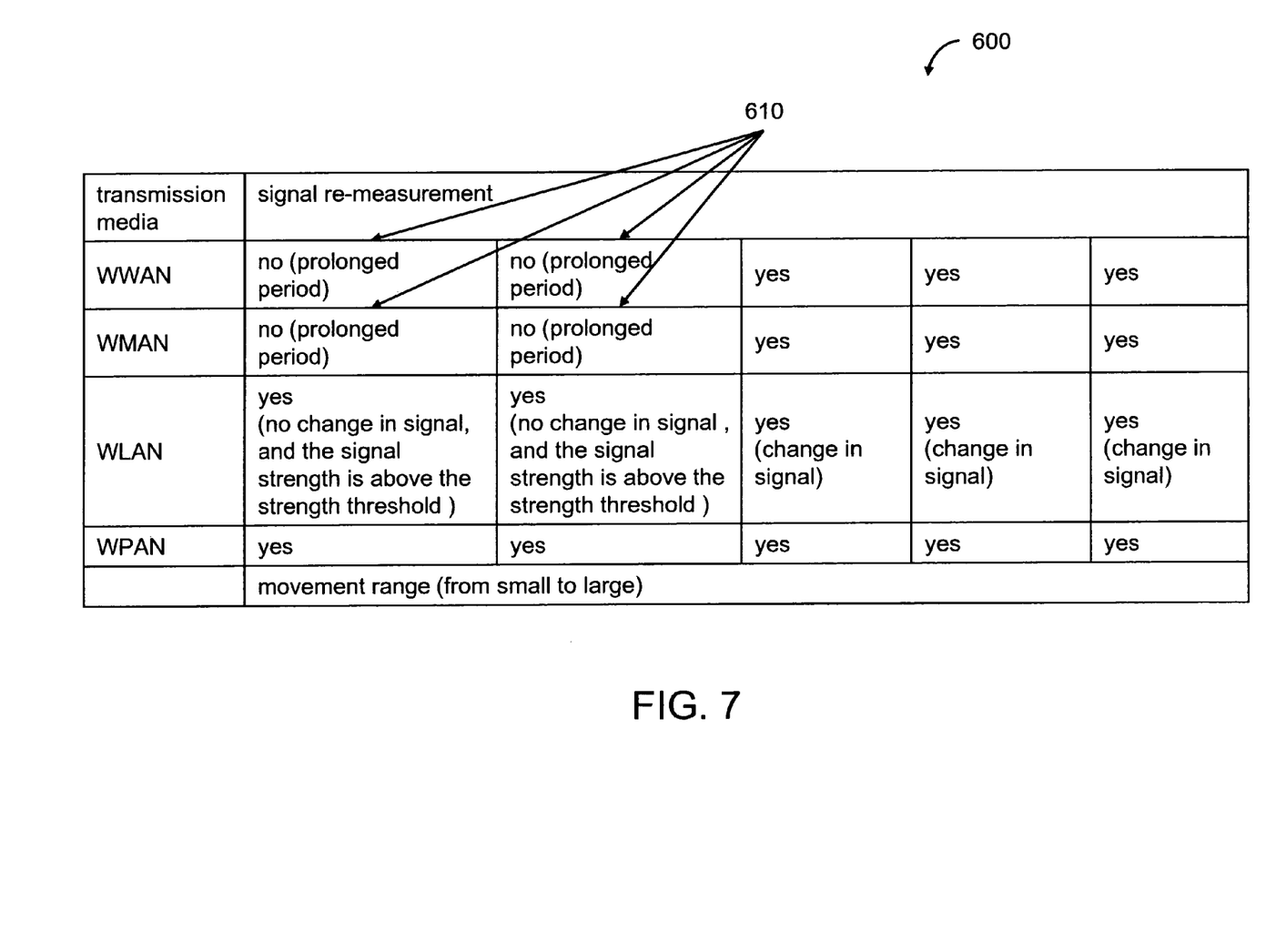
FIG. 7 is a schematic view of the movement range and the signal re-measurement of the communication transmission network of multiple transmission interfaces, when the method of measuring the heterogeneous network mobile communication apparatus of the embodiment is applied to the mobile communication apparatus supporting multiple transmission interfaces to perform communication transmission.

Referring to FIG. 7, according to the aforementioned method, for the mobile communication apparatus 100 applying the present invention, a new table 600 of the movement range and the signal re-measurement of the multiple transmission interfaces in the communication transmission network is generated. It is assumed that the first network transmission interface 110, which is currently active, belongs to the WLAN transmission interface, and the effect of applying the method of the present invention lies in the part 610, wherein the range of the signal measurement period can be prolonged, i.e., the non-active second network transmission interface 120 in WWAN and WMAN with a signal coverage larger than the first transmission interface 110, thereby achieving the effect of saving the power of the mobile communication apparatus 100.

According to the invention, if the signal strength of the active first network transmission interface 110 is unchanged and is clear enough (the signal strength is above the strength threshold), the signal measurement of the second transmission interface 120 is not performed until the non-active second transmission interface 120 reaches its measurement period even if the signal strength of the second transmission interface 120 is poor. Since the transmission quality of interface 120 is poor at this moment, using the interface 120 for transmitting is not recommended. If periodically signal measurement report is required, the invention reports the antecedent signal measurement result of the second transmission interface 120 to the remote network server directly before reaching its measurement period if the signal strength of the first transmission interface 110 is not changed. By solving the power consumption problem caused by frequently activating the signal measurement of the mobile communication apparatus, the efficacies of saving power and improvements the standby time and talk time can be achieved.

The first transmission interface 110 and the second transmission interface 120 of the present invention are respectively selected from the transmission interface group of a wireless wide area network (WWAN), a wireless metropolitan area network (WMAN), a wireless local area network (WLAN), and a wireless personal area network (WPAN), and transmission interfaces developed in the future may well be applied to the method of the present invention.

The method provided by the present invention can also be implemented via a recording medium, wherein the computer program recorded in the recording medium is read and performed, so as to solve the same problem in the same way and achieve the same efficacy, which will not be described herein again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measuring signal strength of signals received wirelessly over different communication networks in a heterogeneous network by a mobile communication apparatus, comprising:
   using a first transmission interface, for periodically measuring a signal received over a first one of the communication networks at a predetermined first period;
   using a signal obtained from the first transmission interface to determine a signal strength, and determining whether the signal strength is changed or not; and
   selectively performing the following steps, according to the determination result of the signal strength:
      if the change of the signal strength is lower than a threshold, resetting a period for measuring a signal of a non-active second transmission interface, whose signal coverage is larger than the first transmission interface, from a predetermined second period to a longer third period, the second transmission interface being used by the mobile communication apparatus for communicating over a second one of the communication networks; or
      if the change of the signal strength is larger than the threshold, periodically measuring the signal according to the predetermined first period of the first transmission interface and periodically measuring the signal according to the predetermined second period of the second transmission interface respectively.

2. The method as claimed in claim 1, wherein the threshold is determined by the hardware configuration and the circuit design of the mobile communication apparatus.

3. The method as claimed in claim 1, wherein the method further comprises periodically measuring the signal according to the predetermined first period of the first transmission interface and the predetermined second period of the second transmission interface respectively, if the signal strength is lower than a predetermined strength threshold value.

4. The method as claimed in claim 1, wherein the method further comprises selectively performing the following steps, if the second transmission interface determines that the third period exists:
   keeping a previous signal measurement result, if the third period is not achieved; and
   re-measuring the signal and updating the signal measurement result, if the third period is achieved.

5. The method as claimed in claim 4, wherein the method further comprises reporting the signal measurement result of the first transmission interface or the second transmission interface to a network server in the first or second communication network, respectively.

6. The method as claimed in claim 5, wherein the previous signal measurement result is reported to the network server in the second communication network at the predetermined second period.

7. The method as claimed in claim 1, wherein the first transmission interface refers to an IP-based wireless network, and the second transmission interface refers to a cellular network in an UMA (Unlicensed Mobile Access) network.

8. The method as claimed in claim 1, wherein the first transmission interface and the second transmission interface are each selected from the transmission interface group of a wireless wide area network (WWAN), a wireless metropolitan area network (WMAN), a wireless local area network (WLAN), and a wireless personal area network (WPAN).

9. The method as claimed in claim 1, wherein the signal strength is obtained by calculating a RSSI (Receive Signal Strength Indication) value in a GSM (Global System for Mobile Communications) system and a WCDMA (Wideband Code Division Multiple Access) system, or by position measurement information in the WCDMA system.

10. The method as claimed in claim 1, wherein the signal coverage refers to a maximum signal covering region provided by a signal access point in the respective communication network.

11. The method as claimed in claim 1, wherein a relationship between the second period and the third period is expressed as:

$$\text{the third period} = N * \text{the second period, wherein}$$
$$1 < N <= \infty;$$

wherein N is any positive number and is adjustable according to a duration when the signal strength is lower than a setting threshold.

12. A non-transitory computer readable medium that stores a program which, when executed, performs a method for measuring signal strength of signals received wirelessly over different communication networks in a heterogeneous network by a mobile communication apparatus having multiple transmission interfaces for communication transmission, said method comprising:
   using a first transmission interface, for periodically measuring a signal received over a first one of the communication networks at a predetermined first period;
   using a signal obtained from the first transmission interface to determine a signal strength, and determining whether the signal strength is changed or not; and
   selectively performing the following steps, according to the determination result of the signal strength:
      if the change of the signal strength is lower than a threshold, resetting a period for measuring a signal of a non-active second transmission interface, whose signal coverage is larger than the first transmission interface, from a predetermined second period to a longer third period, the second network interface being used by the mobile communication apparatus for communicating over a second one of the communication networks; or
      if the change of the signal strength is larger than the threshold, periodically measuring the signal according to the predetermined first period of the first transmission interface and periodically measuring the signal according to the predetermined second period of the second transmission interface respectively.

13. The non-transitory computer readable medium as claimed in claim 12, wherein the threshold is determined by the hardware configuration and the circuit design of the mobile communication apparatus.

14. The non-transitory computer readable medium as claimed in claim 12, wherein if the signal strength is lower than a predetermined strength threshold value, the signal is periodically measured according to the predetermined first period of the first transmission interface and the predetermined second period of the second transmission interface respectively.

15. The non-transitory computer readable medium as claimed in claim 12, wherein if the second transmission interface determines that the third period exists, the method further comprises:
   keeping a previous signal measurement result, if the third period is not achieved; and
   re-measuring the signal and updating the signal measurement result, if the third period is achieved.

16. The non-transitory computer readable medium as claimed in claim 15, wherein the method further comprises reporting the signal measurement result of the first transmission interface or the second transmission interface to a network server in the first or second communication network, respectfully.

17. The non-transitory computer readable medium as claimed in claim 16, wherein the previous signal measurement result is reported to the network server in the second communication network at the predetermined second period.

18. The non-transitory computer readable medium as claimed in claim 12, wherein the first transmission interface refers to an IP-based wireless network, and the second transmission interface refers to a cellular network.

19. The non-transitory computer readable medium as claimed in claim 12, wherein the first transmission interface and the second transmission interface are each selected from the transmission interface group of a wireless wide area network (WWAN), a wireless metropolitan area network (WMAN), a wireless local area network (WLAN), and a wireless personal area network (WPAN).

20. The non-transitory computer readable medium as claimed in claim 12, wherein the signal strength is obtained by calculating a RSSI (Receive Signal Strength Indication) value in a GSM (Global System for Mobile Communications) system and a WCDMA (Wideband Code Division Multiple Access) system, or by position measurement information in WCDMA system.

21. The non-transitory computer readable medium as claimed in claim 12, wherein the signal coverage refers to a maximum signal covering region provided by a signal access point in the respective communication network.

22. The non-transitory computer readable medium as claimed in claim 12, wherein a relationship between the second period and the third period is expressed as:

the third period=$N$*the second period, wherein $1<N<=\infty$;

wherein N is any positive number and is adjustable according to a duration when the signal strength is lower than a setting threshold.

23. A system for measuring signal strength of signals received wirelessly over different communication networks in a heterogeneous network by a mobile communication apparatus, comprising:
a signal strength counting unit, in the mobile communication apparatus, for using a signal received periodically over a first transmission interface from a first one of the communication networks to calculate a signal strength and for determining whether the signal strength is changed or not, the signal being periodically received at a first period; and
a signal measurement period adjusting unit, in the mobile communication apparatus, for selectively performing signal measurement period adjusting, according to the determination result of the signal strength,
wherein if the change of the signal strength is lower than a threshold, a period for measuring a signal of a non-active second transmission interface, whose signal coverage is larger than the first transmission interface, is reset from a predetermined second period to a longer third period, the second transmission interface being used by the mobile communication apparatus for communicating over a second one of the communication networks, and
wherein if the change of the signal strength is larger than the threshold, the signal is periodically measured according to the predetermined first period of the first transmission interface and the signal is periodically measured according to the predetermined second period of the second transmission interface respectively.

24. The system as claimed in claim 23, wherein the threshold is determined by the hardware configuration and the circuit design of the mobile communication apparatus.

25. The system as claimed in claim 23, further comprising periodically measuring the signal according to the predetermined first period of the first transmission interface and the predetermined second period of the second transmission interface respectively, if the signal strength is lower than a predetermined strength threshold value.

26. The system as claimed in claim 23, further comprising selectively performing the following procedures, if the second transmission interface determines that the third period exists:
keeping a previous signal measurement result, if the third period is not achieved; and
re-measuring the signal and updating the signal measurement result, if the third period is achieved.

27. The system as claimed in claim 26, further comprising reporting the signal measurement result of the first transmission interface or the second transmission interface to a network server in a corresponding communication transmission network.

28. The system as claimed in claim 27, wherein the previous signal measurement result is reported to the network server at the predetermined second period.

29. The system as claimed in claim 23, wherein the first transmission interface refers to an IP-based wireless network, and the second transmission interface refers to a cellular network.

30. The system as claimed in claim 23, wherein the first transmission interface and the second transmission interface are each selected from the transmission interface group of a wireless wide area network (WWAN), a wireless metropolitan area network (WMAN), a wireless local area network (WLAN), and a wireless personal area network (WPAN).

31. The system as claimed in claim 23, wherein the signal strength is obtained by calculating a RSSI (Receive Signal Strength Indication) value in a GSM (Global System for Mobile Communications) system and a WCDMA (Wideband Code Division Multiple Access) system, or a position measurement information in a WCDMA system.

32. The system as claimed in claim 23, wherein the signal coverage refers to a maximum signal covering region provided by a signal access point in a communication transmission network.

33. The system as claimed in claim 23, wherein a relationship between the second period and the third period is expressed as:

the third period=$N$*the second period, wherein $1<N<=\infty$;

wherein N is any positive number and is adjustable according to a duration when the signal strength is lower than a setting threshold.

* * * * *